United States Patent
Toyoda et al.

(10) Patent No.: US 12,155,148 B2
(45) Date of Patent: Nov. 26, 2024

(54) STRUCTURE

(71) Applicant: Yazaki Corporation, Tokyo (JP)

(72) Inventors: Ryohei Toyoda, Aichi (JP); YoungHo Jang, Aichi (JP)

(73) Assignee: YAZAKI CORPORATION, Tokyo (JP)

( * ) Notice: Subject to any disclaimer, the term of this patent is extended or adjusted under 35 U.S.C. 154(b) by 393 days.

(21) Appl. No.: 17/740,834

(22) Filed: May 10, 2022

(65) Prior Publication Data

US 2022/0368060 A1 Nov. 17, 2022

(30) Foreign Application Priority Data

May 13, 2021 (JP) .................. 2021-081441

(51) Int. Cl.
  *H01R 13/506* (2006.01)
(52) U.S. Cl.
  CPC .................. *H01R 13/506* (2013.01)
(58) Field of Classification Search
  CPC ...... H01R 13/05; H01R 13/50; H01R 13/506; H01R 2201/26; H01R 13/648; H01R 13/4361; H01R 13/582; H01R 13/58; H01B 7/00; H01B 7/0045; H01B 13/506; H01B 7/0208; B60R 16/0215
  See application file for complete search history.

(56) References Cited

U.S. PATENT DOCUMENTS

| | | | | |
|---|---|---|---|---|
| 4,127,315 A | * | 11/1978 | McKee | H01R 13/58 439/468 |
| 4,432,592 A | * | 2/1984 | Boutros | H01R 13/58 439/460 |
| 5,259,785 A | * | 11/1993 | Inaba | H01R 13/58 439/364 |
| 5,399,103 A | * | 3/1995 | Kuboshima | H01M 50/517 439/504 |
| 5,662,491 A | * | 9/1997 | Antilla | H01R 13/111 439/342 |
| 2018/0269616 A1 | * | 9/2018 | Kot | H01R 13/582 |
| 2019/0036313 A1 | * | 1/2019 | Okamoto | B60R 16/0215 |
| 2019/0308571 A1 | * | 10/2019 | Hagi | H01B 3/50 |
| 2021/0066843 A1 | * | 3/2021 | Tanikawa | H01R 13/5812 |
| 2022/0021160 A1 | * | 1/2022 | Yang | H01R 13/6581 |

FOREIGN PATENT DOCUMENTS

JP      2015-154596 A      8/2015

* cited by examiner

*Primary Examiner* — Christopher M Koehler
*Assistant Examiner* — Gregory L Mangot
(74) *Attorney, Agent, or Firm* — Sughrue Mion, PLLC

(57) ABSTRACT

In a locked state of a structure, a connection part is positioned in a locking area, and a part of a locking protruding part overlaps with a part of a protection member base part in a lateral direction, when viewed from a top-and-bottom direction. Moreover, a third gap formed by a free end and an insertion edge part on a locking direction side of the insertion area in a longitudinal direction is shorter than a length of the locking protruding part in the longitudinal direction. When viewed from the top-and-bottom direction, a first gap exists between a connection outer peripheral face of the connection part and a locking edge part of the locking area in the longitudinal direction, and a second gap exists between the connection outer peripheral face of the connection part and the locking edge part of the locking area in the lateral direction.

2 Claims, 17 Drawing Sheets

STRUCTURE

CROSS-REFERENCE TO RELATED APPLICATION(S)

The present application claims priority to and incorporates by reference the entire contents of Japanese Patent Application No. 2021-081441 filed in Japan on May 13, 2021.

BACKGROUND OF THE INVENTION

1. Field of the Invention

The present invention relates to a structure.

2. Description of the Related Art

A vehicle such as an automobile has a wire harness for mutually connecting various kinds of devices inside thereof. Among such wire harnesses, there is a type that includes a first protector for protecting a routing materials configuring the wire harness from the outside, and a second protector for protecting a connector (a connection member) that connects the routing materials from the outside.

The first protector includes a first housing space that houses the routing materials, and protects the routing materials by housing the routing materials inside the first housing space. The second protector includes a second housing space that houses the connector, and protects the connector by housing the connector inside the second housing space.

As for such a kind of second protector, there is a type that includes: a locking structure that is provided with a cover member having an engagement claw part; and a base member having a locking hole part to be engaged with the engagement claw part (for example, see Japanese Patent Application Laid-open No. 2015-154596).

A structure including a first protector and a second protector can employ a locking structure that includes a locking hole part and a locking claw part capable of being engaged with the locking hole part. In this case, when the length of the locking claw part in the width direction is set longer than the length of the locking hole part in the width direction, it is possible to attach the second protector to the first protector even when there is a dimensional variation in the elongated first protector.

With the locking structure, however, it is difficult to deal with the dimensional variations both in the longitudinal direction and the lateral direction even though it is possible to deal with the dimensional variation in one of the longitudinal direction and the lateral direction. Moreover, as for the elongated first protector extending in the longitudinal direction as the extending direction of the routing materials and holding the routing materials, there is a large dimensional variation for the longitudinal direction. Therefore, it is difficult to deal with such a variation with the locking structure described above.

SUMMARY OF THE INVENTION

The present invention has been made in view of the aforementioned circumstances, and it is an object thereof to provide a structure capable of mounting, when there are two members, an elongated member, which has dimensional variations in the longitudinal and the lateral directions and holds routing materials, to the other member.

In order to achieve the above mentioned object, a structure according to one aspect of the present invention includes a protection member that protects a connection member connected to a routing material; and an elongated holding member extending in a longitudinal direction as an extending direction of the routing material and holding the routing material, wherein the protection member includes: a protection member base part; a locking hole part opened through the protection member base part along a top-and-bottom direction; and an elastic deformation part formed to be elastically deformable with respect to the protection member base part, the elastic deformation part opposing to the locking hole part in the longitudinal direction, when viewed from the top-and-bottom direction, the elastic deformation part has a fixed end on a connecting direction side that is connected to the protection member base part in the longitudinal direction, and has a free end on a locking direction side that is an opposite direction of the connecting direction, the locking hole part includes an insertion area, and a locking area positioned on the locking direction side with respect to the insertion area, the holding member includes: a holding member base part; a locking protruding part that is provided to the holding member base part and capable of being inserted into the insertion area; and a connection part that connects the holding member base part and the locking protruding part, in a locked state where the locking protruding part is engaged with the locking hole part, the connection part is positioned in the locking area and a part of the locking protruding part overlaps with a part of the protection member base part in a lateral direction orthogonal to the longitudinal direction, when viewed from the top-and-bottom direction, in the locked state, a third gap formed by the free end and an insertion edge part of the insertion area on the locking direction side in the longitudinal direction is shorter than a length of the locking protruding part in the longitudinal direction, in the locked state, when viewed from the top-and-bottom direction, a first gap exists between a connection outer peripheral face of the connection part and a locking edge part of the locking area in the longitudinal direction, and a second gap exists between the connection outer peripheral face of the connection part and the locking edge part of the locking area in the lateral direction, and in a state where the locking protruding part is brought in contact with the elastic deformation part to elastically deform the elastic deformation part, the locking protruding part is inserted into the insertion area, the holding member is moved toward the locking direction side, the elastic deformation part is elastically restored, and the locking protruding part is engaged with the locking hole part to be in an engaged state, the connection part is restricted from moving toward the insertion area by the free end.

According to another aspect of the present invention, in the structure, it is preferable that the elastic deformation part includes a first elastic deformation part and a second elastic deformation part positioned by being isolated from each other in the lateral direction, the first elastic deformation part has a fixed end on the connecting direction side that is connected to the protection member base part in the longitudinal direction, and has a free end on the locking direction side, and the second elastic deformation part has a fixed end on the connecting direction side that is connected to the protection member base part in the longitudinal direction, and has a free end on the locking direction side.

The above and other objects, features, advantages and technical and industrial significance of this invention will be better understood by reading the following detailed descrip-

DETAILED DESCRIPTION OF THE PREFERRED EMBODIMENTS

Hereinafter, embodiments of a structure according to the present invention will be described with reference to the accompanying drawings. Note that the present invention is not limited by the embodiments. Furthermore, the structural elements of the embodiments described hereinafter include elements easily occurred to those skilled in the art or substantially the same elements.

Figure 1:
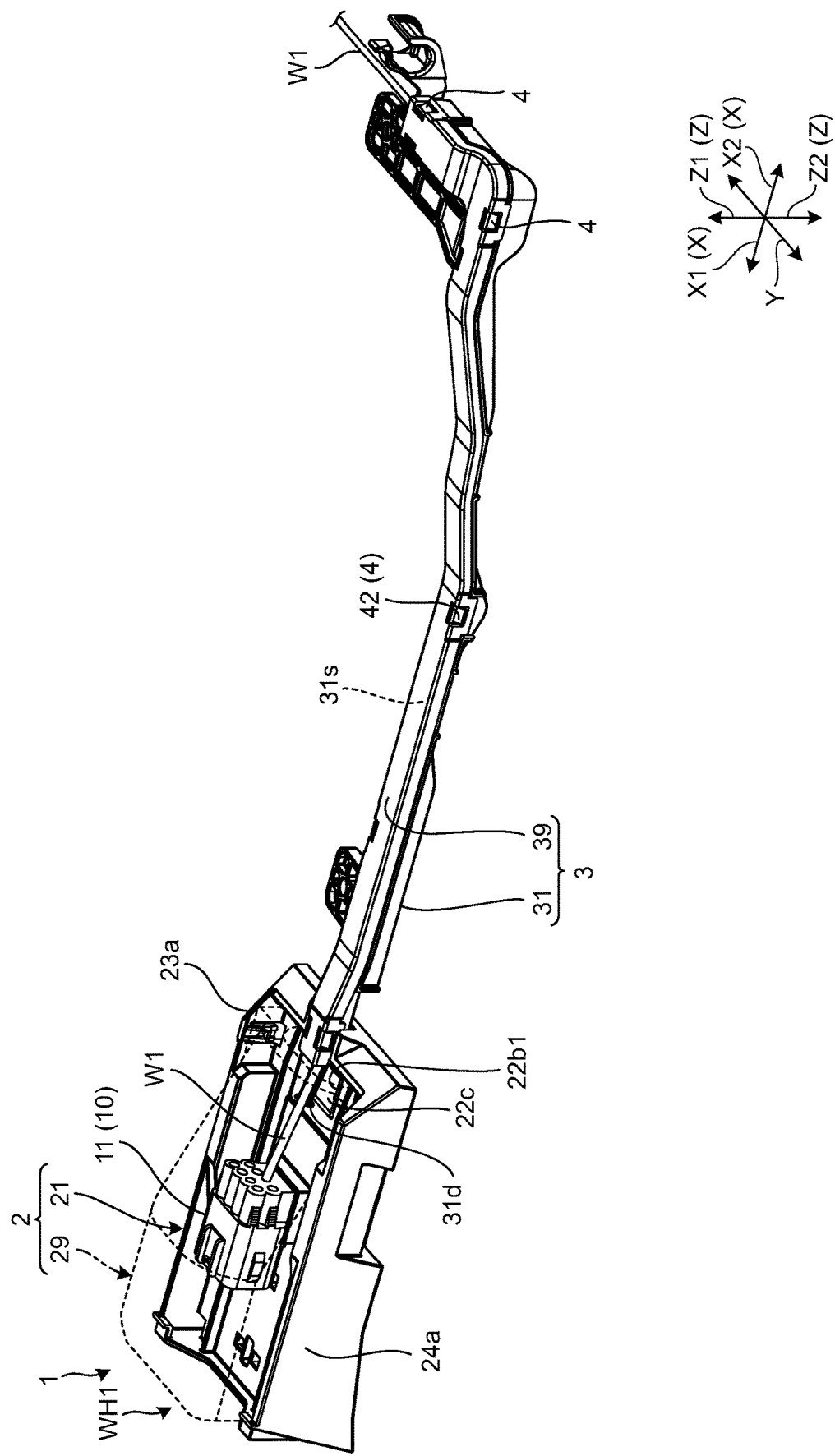
FIG. 1 is a perspective view of a structure according to a first embodiment.
Figure 2:
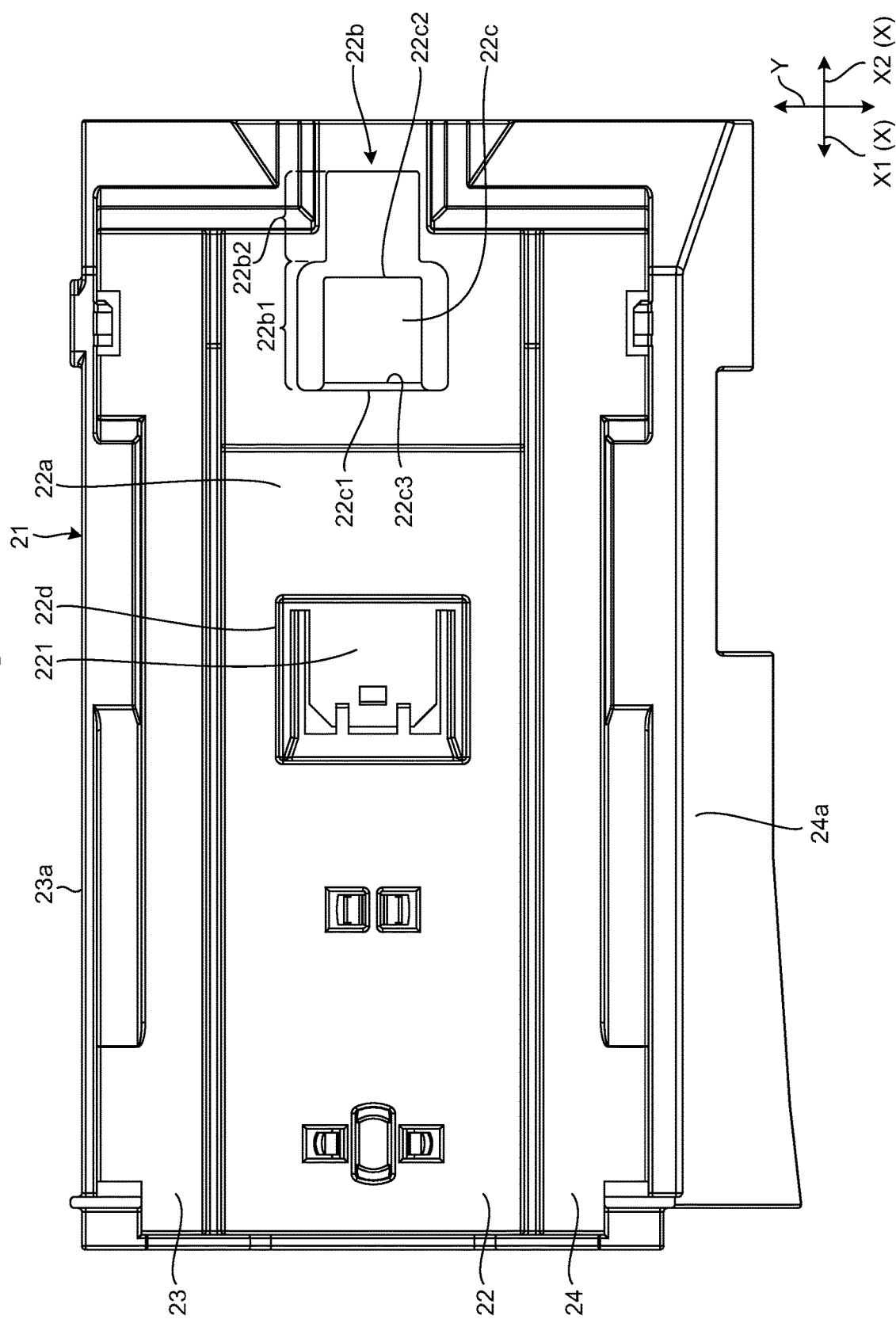
FIG. 2 is a plan view of a first base member provided to the structure according to the first embodiment.
Figure 3:
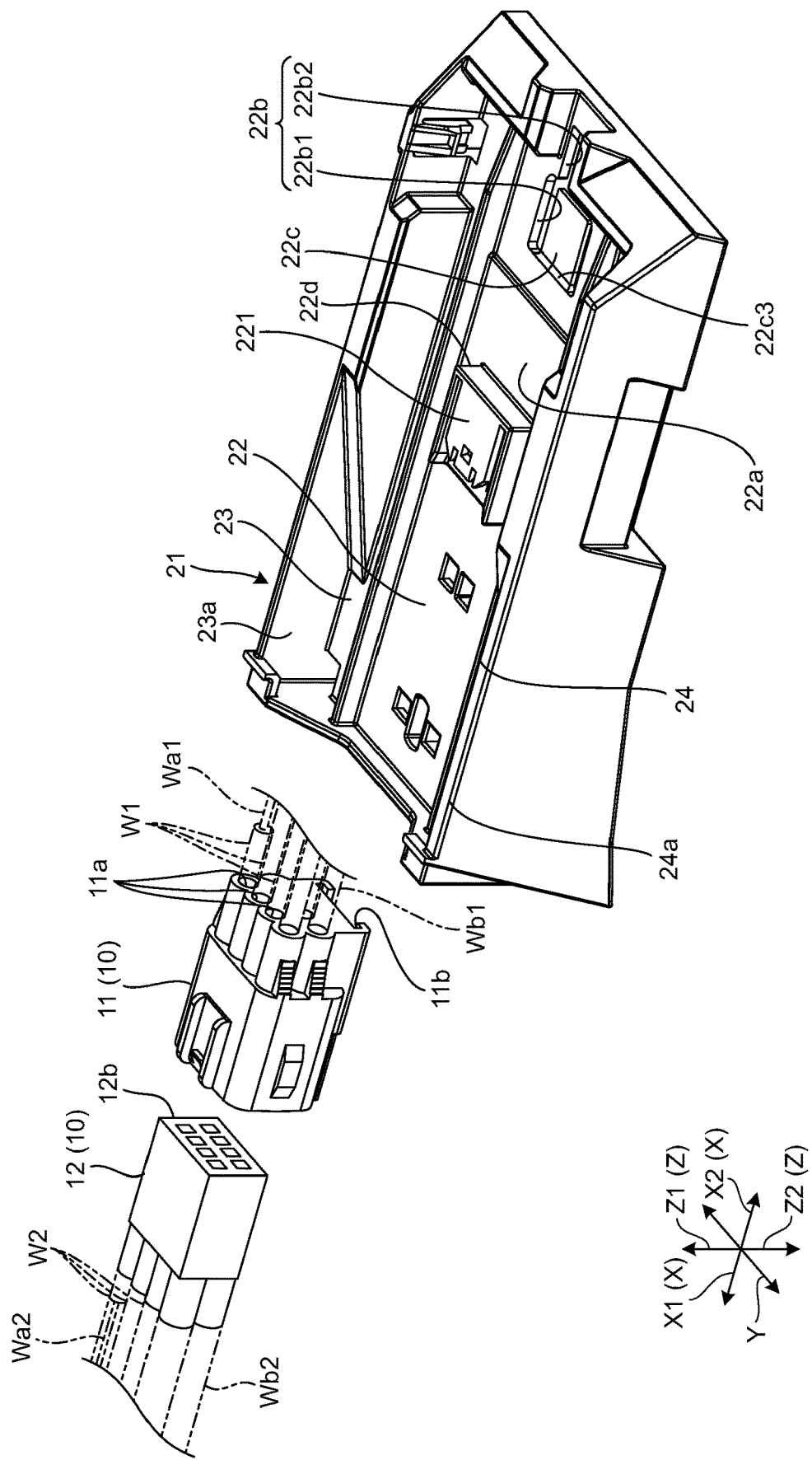
FIG. 3 is a perspective view of the first base member, a first connector, and a second connector provided to the structure of the first embodiment.
Figure 4:
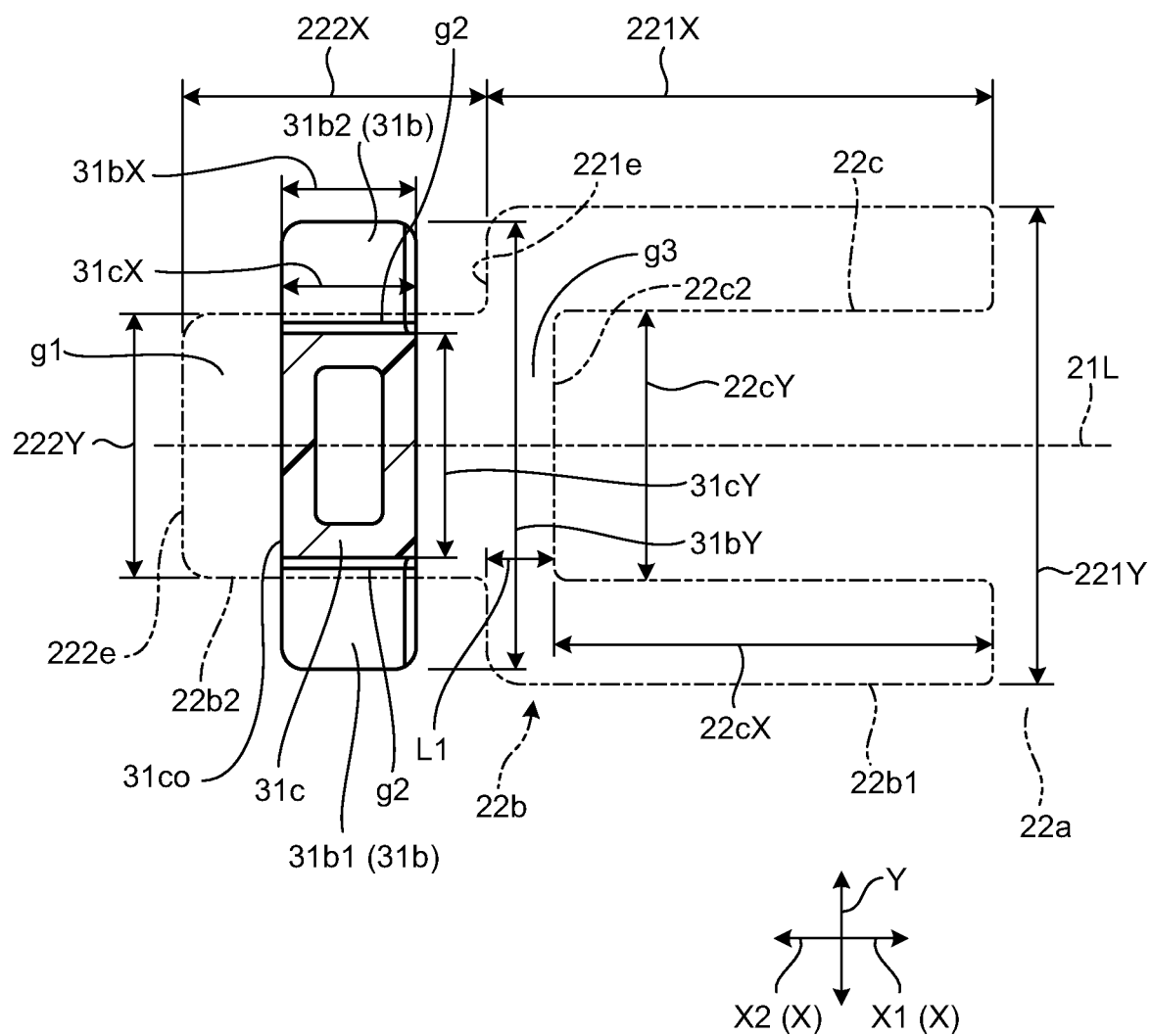
FIG. 4 is a sectional view of a connection part orthogonal to a top-and-bottom direction thereof.

FIG. 1 is a perspective view of a structure 1 according to a first embodiment. FIG. 2 is a plan view of a first base member 21 provided to the structure 1 according to the first embodiment. FIG. 3 is a perspective view of the first base member 21, a first connector 11, and a second connector 12 provided to the structure 1 of the first embodiment. FIG. 4 is a sectional view of a connection part 31c orthogonal to a top-and-bottom direction Z thereof. As for a first routing material W1 in FIG. 1, only a single piece thereof is illustrated by omitting the others for the sake of explanations.

In the explanations hereinafter, "X1" is a connecting direction of the structure 1 according to the embodiments. Note that "X2" is a locking direction that is the opposite direction of the connecting direction X1. Furthermore, "X" is a longitudinal direction including the connecting direction X1 and the locking direction X2. Furthermore, in the structure 1 according to the embodiments, "Y" is a lateral direction Y that is orthogonal to the connecting direction X1 and the locking direction X2. Moreover, in the structure 1 according to the embodiments, "Z" is a top-and-bottom direction that is orthogonal to the longitudinal direction X and the lateral direction Y. In addition, "Z1" is the top direction of the top-and-bottom direction Z, and "Z2 is the bottom direction of the top-and-bottom direction Z. In the structure 1 according to the embodiments, the longitudinal direction X, the lateral direction Y, and the top-and-bottom direction Z are orthogonal to each other.

First Embodiment

The structure 1 according to the first embodiment illustrated in FIG. 1 is mounted onto a wire harness WH1 loaded on a vehicle such as an automobile, and protects routing materials W and a connection member (connector) 10. For connecting each of devices loaded on a vehicle, for example, the wire harness WH1 is formed as an assembly of a plurality of routing materials W used for power supply and signal communication so as to connect the routing materials W to each of the devices via the connection member 10 and the like.

The wire harness WH1 according to the present embodiment includes the first routing material (routing material) W1, a second routing material W2, a first connector (connection member) 11, a second connector 12, a first protector (protection member) 2, and a second protector (holding member) 3. The first routing material W1 and the second routing material W2 are configured with electrical wires, for example. The electrical wire is formed by covering, with coating parts Wb1, Wb2 exhibiting insulation, the outer side of core materials Wa1, Wa2 as a conductor part formed with a plurality of conductive metal wires (see FIG. 3). Note that the wire harness WH1 may be configured by further including an electrical junction box, a grommet, a fixture, and the like.

The first routing material W1 includes the first conductive core material Wa1, and the first insulating coating part Wb1 that covers the outer peripheral face of the first core material Wa1. The second routing material W2 includes the second conductive core material Wa2, and the second insulating coating part Wb2 that covers the outer peripheral face of the second core material Wa2. To the first connector 11, a terminal of the first routing material W1 is inserted. To the second connector 12, a terminal of the second routing material W2 is inserted. The first protector 2 protects the first connector 11 and the second connector 12 from the outside. The second protector 3 protects the first routing material W1 from the outside. Hereinafter, the configuration of the structure 1 will be described in detail by referring to each of the drawings.

The first connector 11 is formed with an insulating synthetic resin, for example, and a plurality of first cavities 11a are formed on the top part along the top-and-bottom direction Z as illustrated in FIG. 3. To each of the first cavities 11a, the terminal of the first routing material W1 is inserted. Furthermore, the first connector 11 includes a connector engagement recessed part 11b on the bottom part along the top-and-bottom direction Z. Furthermore, the first connected 11 has a connector fitting recessed part formed at an end part on the connecting direction X1 side, to which the second connector 12 can be inserted.

The second connector 12 is formed with an insulating synthetic resin, for example, and a plurality of second cavities are formed on the top part along the top-and-bottom direction Z. To each of the second cavities, the terminal of the second routing material W2 is inserted. Furthermore, the second connector 12 includes a connector fitting protruding part 12b at an end on the locking direction X2 side, which is inserted into the connector fitting recessed part of the first connector 11.

The first protector 2 is formed with an insulating synthetic resin material, and disposed on the rear side of the feet of a passenger on a rear seat of a vehicle, for example. The first protector 2 protects the first connector (connection member) 11 connected to the first routing material W1. The first protector 2 according to the present embodiment includes the first base member 21, and a first cover member 29 that is mounted to the first base member 21.

When viewed from the top-and-bottom direction Z, as illustrated in FIG. 2, the first base member 21 includes a base main body part 22 positioned in the center of the lateral direction Y, and a pair of base both-side parts 23, 24 positioned on both sides of the lateral direction Y.

The base main body part 22 includes a first main body base part (protection member base part) 22a, a locking hole part 22b, and an elastic deformation part 22c. The first main body base part (protection member base part) 22a is formed in a rectangular plate shape, and a connector attachment part 22d for attaching the first connector 11 is provided on the top face side thereof (see FIG. 3). The connector attachment part 22d is provided in the center of the base main body part 22 in the lateral direction Y. Then, in the connector attachment part 22d, a connector claw part 221, which is engaged with the connector engagement recessed part 11b of the first connector 11, is provided.

The locking hole part 22b is opened through the first main body base part 22a in the top-and-bottom direction Z. The locking hole part 22b according to the present embodiment is disposed in the center of the first base member 21 in the lateral direction Y. As illustrated in FIG. 4, the locking hole part 22b includes an insertion area 22b1, and a locking area 22b2 disposed on the locking direction X2 side of the longitudinal direction X with respect to the insertion area 22b1. Furthermore, the elastic deformation part 22c is disposed in the insertion area 22b1.

The insertion area 22b1 is formed in a rectangular shape, in which the length in the longitudinal direction X is 221X and the length in the lateral direction Y is 221Y. The insertion area 22b1 is disposed in the first base member 21 such that the center line of the insertion area 22b1 in the lateral direction Y matches a center line 21L of the first base member 21 in the lateral direction Y.

The locking area 22b2 is formed in a rectangular shape, in which the length in the longitudinal direction X is 222X and the length in the lateral direction Y is 222Y. The length 222Y of the locking area 22b2 in the lateral direction Y is shorter than the length 221Y of the insertion area 22b1 in the lateral direction Y. Furthermore, the length 222X of the locking area 22b2 in the longitudinal direction X is shorter than the length 221X of the insertion area 22b1 in the longitudinal direction X. The locking area 22b2 is disposed in the first base member 21 such that the center line of the locking area 22b2 in the lateral direction Y matches the center line 21L of the first base member 21 in the lateral direction Y.

The elastic deformation part 22c is disposed in the center of the first base member 21 in the lateral direction Y. The elastic deformation part 22c is formed to be elastically deformable with respect to the first main body base part (protection member base part) 22a. More specifically, as for the elastic deformation part 22c, a fixed end 22c1 side is elastically deformed, so that a free end 22c2 becomes movable in the top-and-bottom direction Z. Furthermore, the elastic deformation part 22c is formed in a flat rectangular shape. Furthermore, when viewed from the top-and-bottom direction Z, the elastic deformation part 22c opposes to the locking hole part 22b in the longitudinal direction X. More specifically, an edge part of the elastic deformation part 22c on the locking direction X2 side opposes to an edge part of the locking area 22b2 on the connecting direction X1 side of the locking hole part 22b.

As for the elastic deformation part 22c, the length in the longitudinal direction X is 22cX and the length in the lateral direction Y is 22cY. The length 22cY of the elastic deformation part 22c in the lateral direction Y is shorter than the length 221Y of the insertion area 22b1 in the lateral direction Y. Furthermore, the length 22cX of the elastic deformation part 22c in the longitudinal direction X is shorter than the length 221X of the insertion area 22b1 in the longitudinal direction X. Furthermore, the elastic deformation part 22c is disposed in the insertion area 22b1. The elastic deformation part 22c is disposed in the first base member 21 such that the center line of the elastic deformation part 22c in the lateral direction Y matches the center line 21L of the first base member 21 in the lateral direction Y.

As for the elastic deformation part 22c, the thickness in the top-and-bottom direction Z is thinner than the thickness of the first main body base part 22a in the top-and-bottom direction Z, and the bottom face in the top-and-bottom direction Z of the elastic deformation part 22c matches the bottom face in the top-and-bottom direction Z of the first main body base part 22a Z. In the meantime, a step part 22c3 is formed between the top face in the top-and-bottom direction Z of the elastic deformation part 22c and the top face in the top-and-bottom direction Z of the first main body base part 22a.

The connecting direction X1 side of the elastic deformation part 22c to be connected to the first main body base part 22a in the longitudinal direction X is the fixed end 22c1, while the locking direction X2 side thereof is the free end 22c2.

As for the elastic deformation part 22c and the locking hole part 22b in the longitudinal direction X, a third gap g3 is formed by the free end 22c2 and an insertion edge part 221e on the locking direction X2 side of the insertion area 22b1. Furthermore, a length L1 of the third gap g3 in the longitudinal direction X illustrated in FIG. 4 is shorter than a length 31bX of a locking protruding part 31b in the longitudinal direction X. Therefore, the locking protruding part 31b is restricted from being pulled out toward the top-and-bottom direction Z from the locking hole part 22b.

The first base member 21 includes a pair of opposing walls 23a and 24a which are positioned at each of the base both-side parts 23 and 24, respectively, and oppose to each other in the lateral direction Y.

The first cover member 29 illustrated in FIG. 1 is formed in a gutter shape with both end parts in the longitudinal direction X and one end part in the top-and-bottom direction Z (bottom end prat in the top-and-bottom direction Z) being opened, and includes a first housing space 29s. As for the first protector 2 according to the present embodiment in a state where the first cover member 29 is attached to the first base member 21, the first connector 11 and the second connector 12 are disposed in the first housing space 29s of the first cover member 29. That is, with the first protector 2, the first connector 11 and the second connector 12 are housed in the first housing space 29s of the first cover member 29, so that the first connector 11 and the second connector 12 are protected from the outside by the first protector 2.

The second protector 3 is formed with an insulating synthetic resin material, and mounted to the first protector 2. As illustrated in FIG. 1, the second protector 3 extends along the longitudinal direction X that is the extending direction of the first routing material W1 to be formed into an elongated shape for holding the first routing material W1. The second protector 3 according to the present embodiment includes a second base member 31, a second cover member 39, and a locking structure 4.

The second base member 31 is formed in a gutter shape with an end part on the connecting direction X1 side of the longitudinal direction X, an end part on the opposite direction side of the longitudinal direction X, and one end part in the top-and-bottom direction Z (top end part in the top-and-bottom direction Z) being opened, and includes a second housing space 31s. In the second housing space 31s, the first routing material W1 is housed. The first routing material W1 is inserted from an opening positioned at one end part in the top-and-bottom direction Z, and the opening is closed by the second cover member 39. Furthermore, as illustrated in FIG. 1, as for the second protector 3 in a state where the second cover member 39 is mounted to the second base member 31, the first routing material W1 is inserted from each of the end part on the connecting direction X1 side and the end part on the opposite side of the connecting direction X1 side.

The second base member 31 includes a second main body base part (holding member base part) 31a, the locking protruding part 31b, the connection part 31c, and a guide part 31d.

The second main body base part (holding member base part) 31a includes: a bottom wall positioned in the bottom end part in the top-and-bottom direction Z; and base opposing walls opposing to each other in the lateral direction Y and protruding toward the top direction Z1 side of the top-and-bottom direction Z from each of both end parts of the bottom wall in the lateral direction Y.

Figure 5:
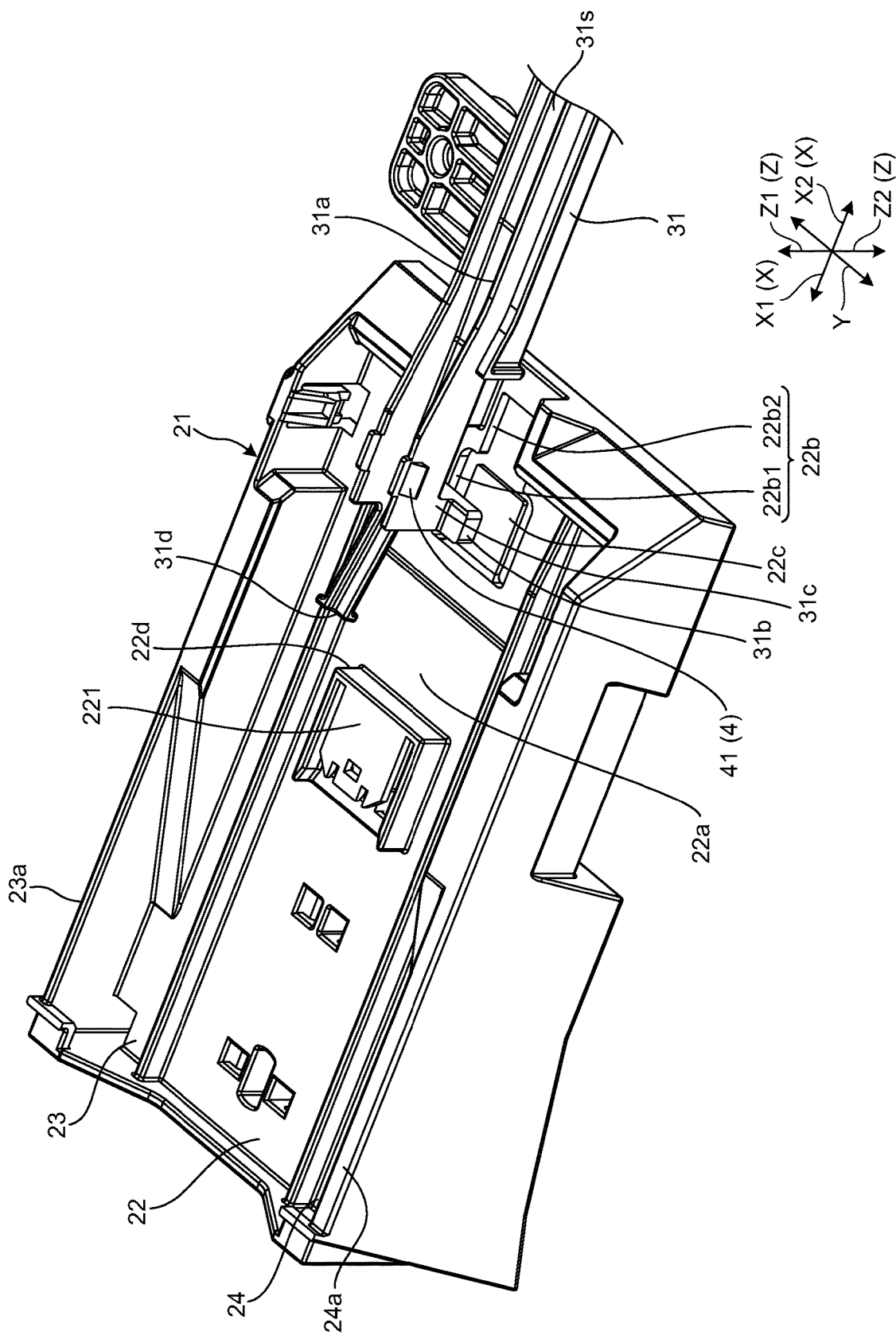
FIG. 5 is a perspective view for describing assembly of the structure in order, in assembly work of the structure according to the first embodiment.

As illustrated in FIG. 4 and FIG. 5, the locking protruding part 31b is provided in the second main body base part 31a, and can be inserted into the insertion area 22b1. The locking protruding part 31b is attached to the bottom wall of the second main body base part 31a via the connection part 31c.

When viewed from the top-and-bottom direction Z, the locking protruding part 31b is formed in a rectangular shape. Furthermore, when viewed from the top-and-bottom direction Z, the locking protruding part 31b protrudes toward the outer side of the lateral direction Y from both end parts of the connection part 31c in the lateral direction Y. That is, when viewed from the top-and-bottom direction Z, the locking protruding part 31b includes a pair of protruding parts 31b1 and 31b2 protruding toward the outer side of the lateral direction Y from both end parts of the connection part 31c in the lateral direction Y. Furthermore, the length of the locking protruding part 31b in the lateral direction Y is longer than the length of the connection part 31c in the lateral direction Y. The length of the locking protruding part 31b in the longitudinal direction X is the same as the length of the connection part 31c in the longitudinal direction X.

As for the locking protruding part 31b, the length in the longitudinal direction X is 31bX, and the length in the lateral direction Y is 31bY. Furthermore, the length 31bX in the longitudinal direction X of the locking protruding part 31b is shorter than the length 221X in the longitudinal direction X of the insertion area 22b1. Moreover, the length 31bY in the lateral direction Y of the locking protruding part 31b is shorter than the length 221Y in the lateral direction Y of the insertion area 22b1. Therefore, the locking protruding part 31b can be inserted into the insertion area 22b1, and can be pulled out from the insertion area 22b1.

The length 31bY in the lateral direction Y of the locking protruding part 31b is longer than the length 222Y in the lateral direction Y of the locking area 22b2. Therefore, the locking protruding part 31b is restricted from being inserted from the locking area 22b2 and restricted from being pulled out from the locking area 22b2.

When viewed from top-and-bottom direction Z, the connection part 31c is formed in a rectangular shape. As for the connection part 31c, the length in the longitudinal direction X is 31cX, and the length in the lateral direction Y is 31cY. Furthermore, the length 31cX in the longitudinal direction X of the connection part 31c is shorter than the length 222X in the longitudinal direction X of the locking area 22b2. Moreover, the length 31cY in the lateral direction Y of the connection part 31c is shorter than the length 222Y in the lateral direction Y of the locking area 22b2. Therefore, the connection part 31c is movable inside the locking area 22b2.

As illustrated in FIG. 5, the guide part 31d is provided to protrude toward the connecting direction X1 side from the end part on the connecting direction side of the second main body base part 31a, and extends in the connecting direction X1. The guide part 31d supports the first routing material W1 between the second main body base part 31a and the first connector 11 in the longitudinal direction X.

The locking structure 4 is a structure for locking the second base member 31 and the second cover member 39. The locking structure 4 according to the present embodiment is configured with: a locking claw part 41 provided to the second base member 31; and a locked part 42 which is provided to the second cover member 39 and to which the locking claw part 41 can be inserted.

Next, a mounting method of the structure 1 according to the present embodiment will be described. An operator disposes a plurality of the first routing materials W1 in the second housing space 31s of the second base member 31.

Then, the operator inserts the locking claw part 41 to the locked part 42 to attach the second cover member 39 to the second base member 31. Then, in a state where the second cover member 39 is attached to the second base member 31, a part of the first routing materials W1 on the connecting direction X1 side housed in the second housing space 31s is exposed from the opening on the connecting direction X1 side of the second base member 31.

Then, the operator attaches the first base member 21 to a car body. Then, as illustrated in FIG. 5, the operator disposes the locking protruding part 31b of the second protector 3 on the top direction Z1 side of the insertion area 22b1 in the first base member 21.

Figure 6:
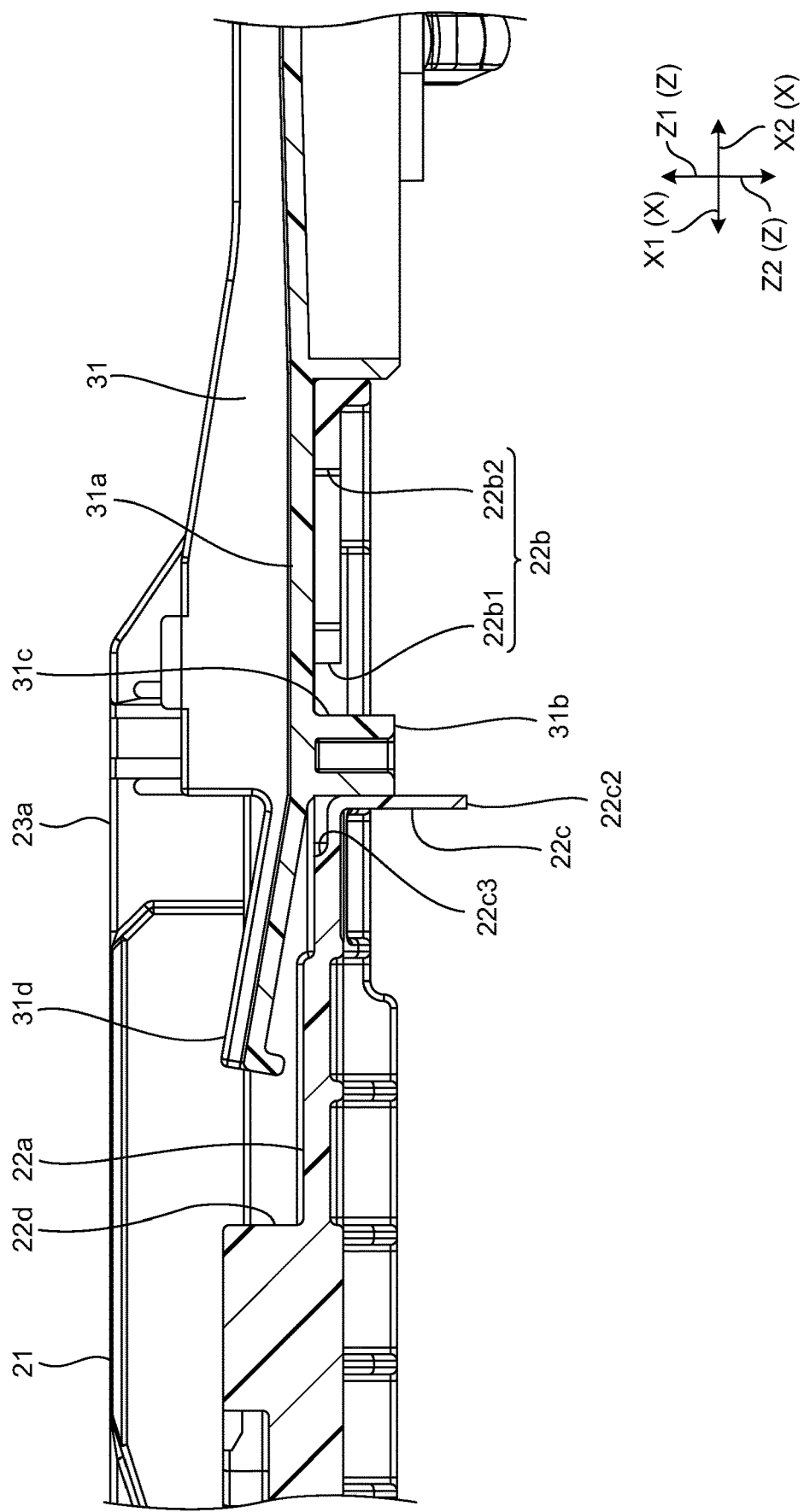
FIG. 6 is a sectional view for describing assembly of the structure in order, in assembly work of the structure according to the first embodiment.

Then, the operator moves the second protector 3 toward the bottom direction Z2 to bring the bottom face of the locking protruding part 31b to be in contact with the top face of the elastic deformation part 22c. Then, the operator continues to move the second protector 3 toward the bottom direction Z2 to elastically deform the elastic deformation part 22c as illustrated in FIG. 6, and the locking protruding part 31b is inserted into the insertion area 22b1. At this time, the fixed end 22c1 of the elastic deformation part 22c is elastically deformed, and the free end 22c2 thereof faces toward the bottom direction Z2. Furthermore, the locking protruding part 31b and the connection part 31c are disposed in the insertion area 22b1.

Then, the operator moves the second protector 3 toward the locking direction X2 side. Thus, the locking protruding part 31b and the connection part 31c are moved toward the locking direction X2 side.

Figure 7:
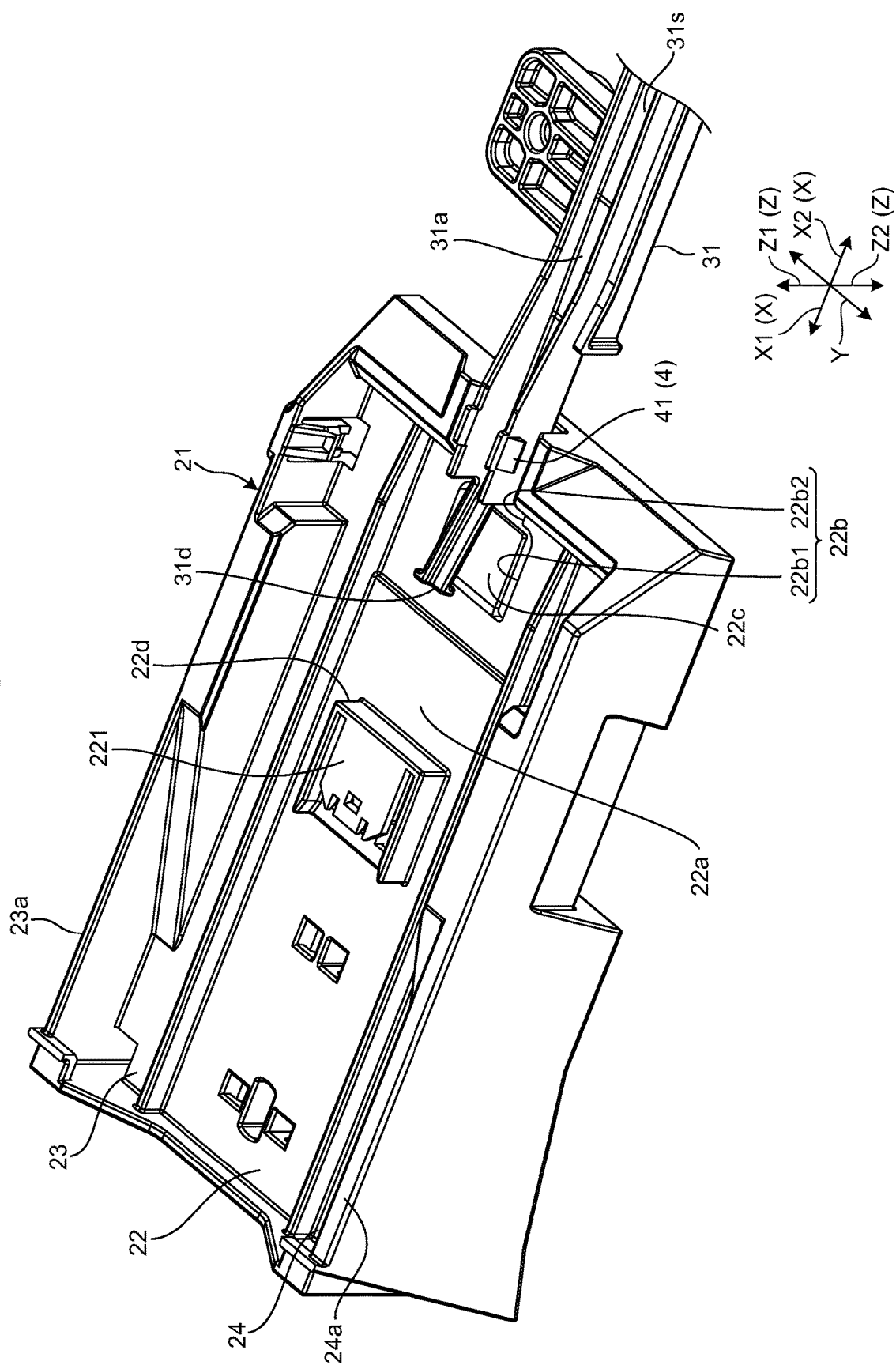
FIG. 7 is a perspective view for describing assembly of the structure in order, in assembly work of the structure according to the first embodiment.
Figure 8:
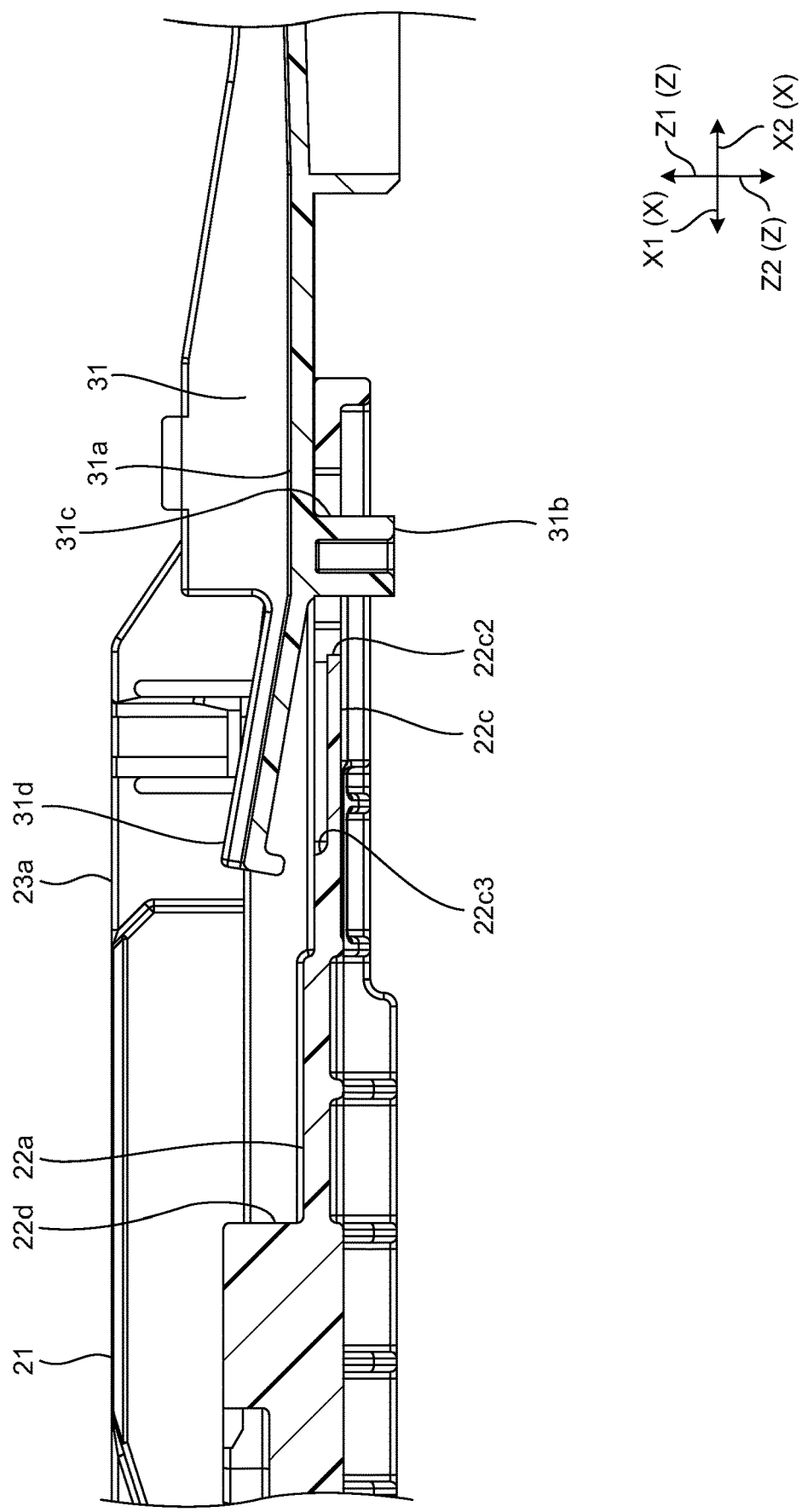
FIG. 8 is a sectional view for describing assembly of the structure in order, in assembly work of the structure according to the first embodiment.

When the second protector 3 is continuously moved toward the locking direction X2 side, the locking protruding part 31b and the elastic deformation part 22c gradually come to be in noncontact. Thus, as illustrated in FIG. 7 and FIG. 8, the elastic deformation part 22c is elastically restored and the connection part 31c moves to the locking area 22b2, so that the locking protruding part 31b is engaged with the locking hole part 22b to be in a locked state.

As described above, as for the locking protruding part 31b, the length 31bY in the lateral direction Y of the locking protruding part 31b is shorter than the length 221Y in the lateral direction Y of the locking area 22b2. Therefore, in the locked state, as illustrated in FIG. 4, when viewed from the top-and-bottom direction Z, a part of the locking protruding part 31b overlaps with a part of the first main body base part (protection member base part) 22a in the lateral direction Y. Therefore, the locking protruding part 31b is restricted from being pulled out toward the top-and-bottom direction Z from the locking area 22b2.

Furthermore, in the locked state, in the longitudinal direction X, the length of the third gap g3 (the length L1 in the longitudinal direction X of the third gap g3 in FIG. 4) formed by the free end 22c2 and the insertion edge part 221e on the locking direction X2 side of the insertion area 22b1 is shorter than the length 31bX of the locking protruding part 31b in the longitudinal direction X. Therefore, the locking protruding part 31b is restricted from being pulled out toward the top-and-bottom direction Z from the insertion area 22b1.

Furthermore, as for the structure 1 in the locked state, the connection part 31c is restricted from moving toward the insertion area 22b1 by the free end 22c2 of the elastic deformation part 22c.

Furthermore, in the locked state, when viewed from the top-and-bottom direction Z, a first gap g1 exists between a connection outer peripheral face 310 of the connection part 31c and a locking edge part 222e of the locking area 22b2 in the longitudinal direction X, and a second gap g2 exists between the connection outer peripheral face 310 of the connection part 31c and the locking edge part 222e of the locking area 22b2 in the lateral direction Y. Therefore, even in the locked state, the connection part 31c is movable inside the locking area 22b2 for the longitudinal direction X and the lateral direction Y.

Then, the operator inserts the terminals provided at the end parts of each of the first routing materials W1 to a first cavity 11a of the first connector 11, and connects the first routing materials W1 to the first connector 11.

Then, the operator attaches the first connector 11 to the first base member 21. Thereafter, the operator fits the second connector 12 to the first connector 11. In a state where the second connector 12 is fitted to the first connector 11, the second core materials Wa2 of the second routing materials W2 connected to the second connector 12 and the first core materials Wa1 of the first routing materials W1 connected to the first connector 11 are electrically connected.

At last, the operator mounts the first cover member 29 to the first base member 21, and assembling of the structure 1 is completed.

The structure 1 according to the present embodiment has the following configuration. In a locked state where the locking protruding part 31b is engaged with the locking hole part 22b, the connection part 31c is positioned in the locking area 22b2 and, when viewed from the top-and-bottom direction Z, a part of the locking protruding part 31b overlaps with a part of the protection member base part 22a in the lateral direction Y. Furthermore, in the locked state, when viewed from the top-and-bottom direction Z, the first gap g1 exists between the connection outer peripheral face 310 of the connection part 31c and the locking edge part 222e of the locking area 22b2 in the longitudinal direction X, and the second gap g2 exists between the connection outer peripheral face 310 of the connection part 31c and the locking edge part 222e of the locking area 22b2 in the lateral direction Y. Moreover, in the locked state, the third gap g3 formed by the free end 22c2 and the insertion edge part 221e on the locking direction X2 side of the insertion area 22b1 in the longitudinal direction X is shorter than the length of the locking protruding part 31b in the longitudinal direction X. Therefore, with the structure 1 according to the present embodiment, as for the holding member 3, in a state where the locking protruding part 31b is brought in contact with the elastic deformation part 22c to deform the elastic deformation part 22c so as to insert the locking protruding part 31b into the insertion area 22b1 of the locking hole part 22b, the connection part 31c is moved toward the locking area 22b2 from the insertion area 22b1 in the longitudinal direction X, the elastic deformation part 22c is elastically restored, and the locking protruding part 31b is engaged with the locking hole part 22b to be in an engaged state, the connection part 31c is restricted from moving toward the insertion area 22b1 by the free end 22c2. As a result, with the structure 1 according to the present embodiment in the locked state, the connection part 31c can move in the longitudinal direction X and the lateral direction Y in the locking area 22b2. Therefore, it is possible to mount the protection member 2 and the holding member 3 even when there is a dimensional variation in the two members in the longitudinal direction X and the lateral direction Y, and also possible to mount the protection member 2 and the holding member 3 even when there is a large dimensional variation in the longitudinal direction X of the holding member 3.

Second Embodiment

Next, a structure 1A according to a second embodiment will be described. Hereinafter, explanations of the same structural elements as those of the structure 1 according to the first embodiment are omitted by applying same reference signs thereto, and different structural elements are to be described.

Figure 9:
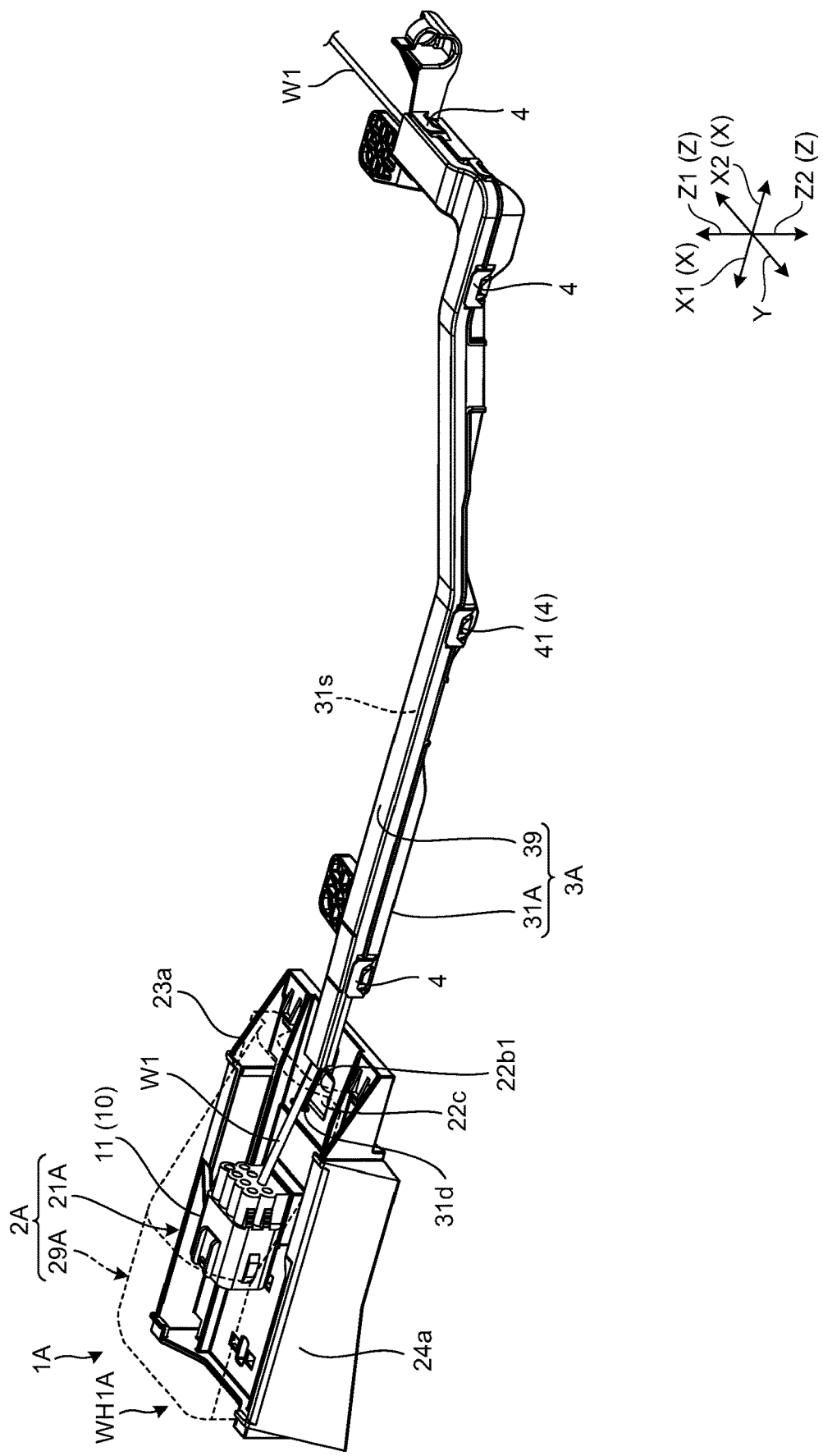
FIG. 9 is a perspective view of a structure according to a second embodiment.
Figure 10:
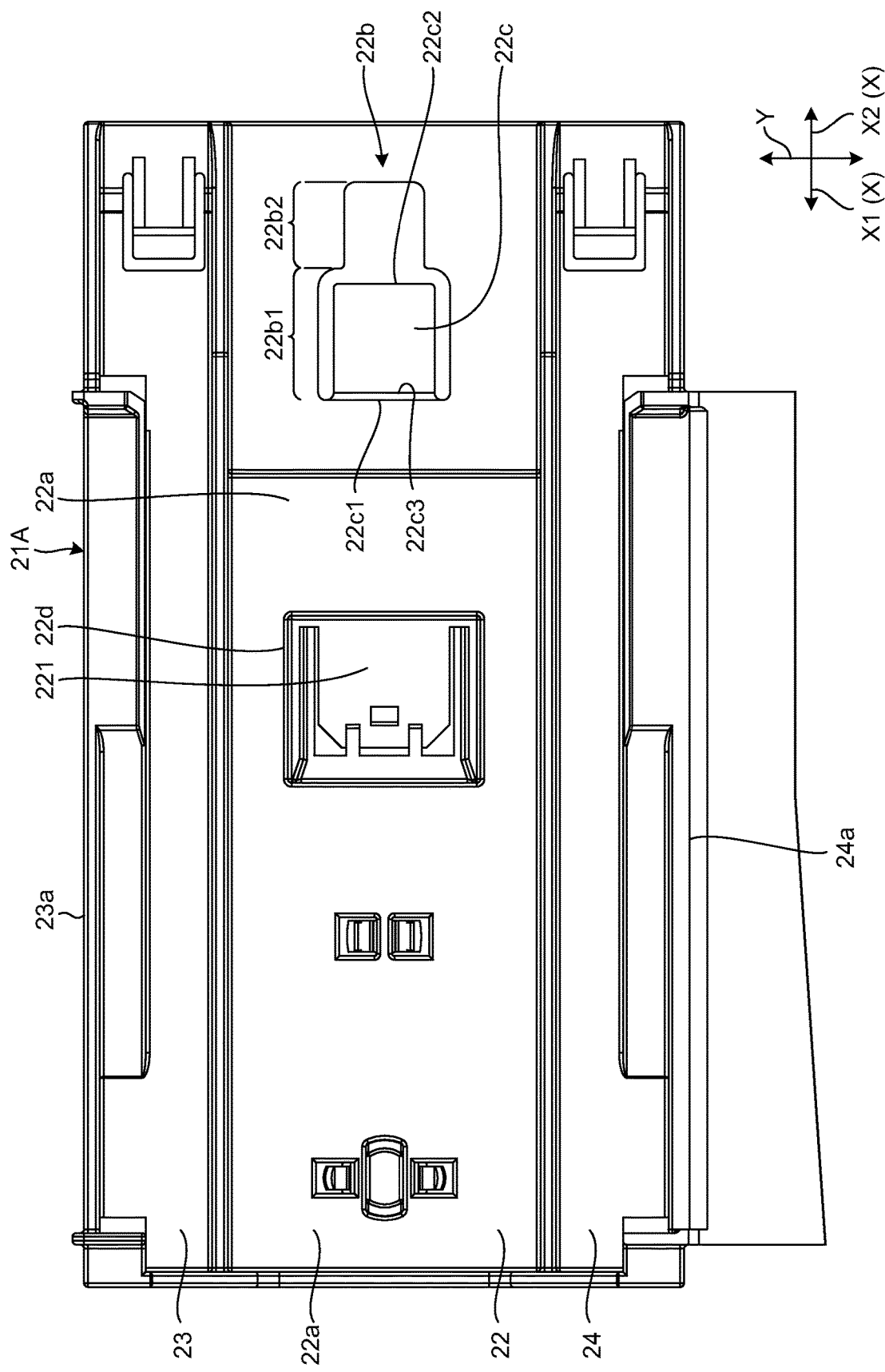
FIG. 10 is a plan view of a first base member provided to the structure according to the second embodiment.
Figure 11:
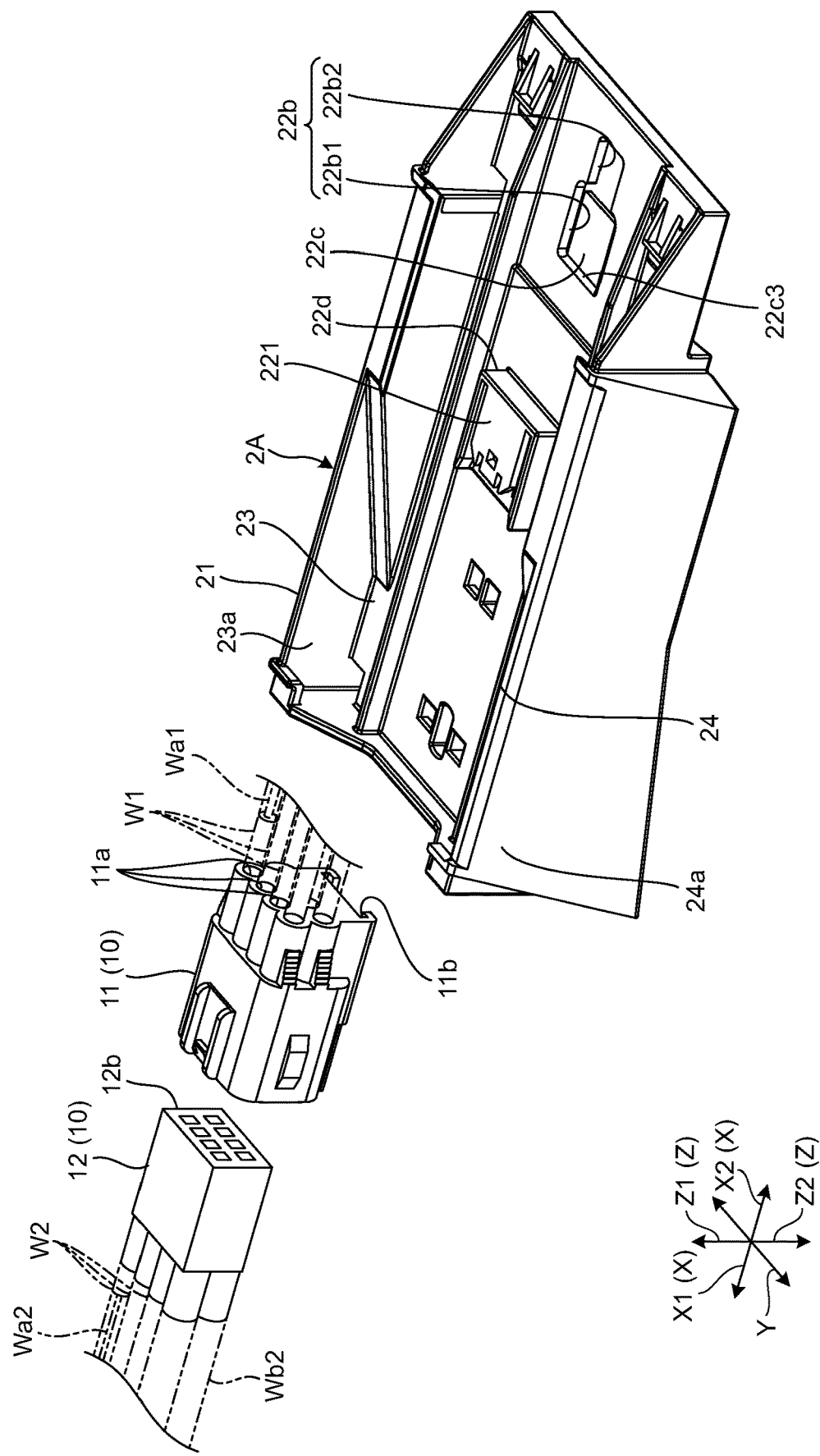
FIG. 11 is a perspective view of the first base member, a first connector, and a second connector provided to the structure of the second embodiment.
Figure 12:
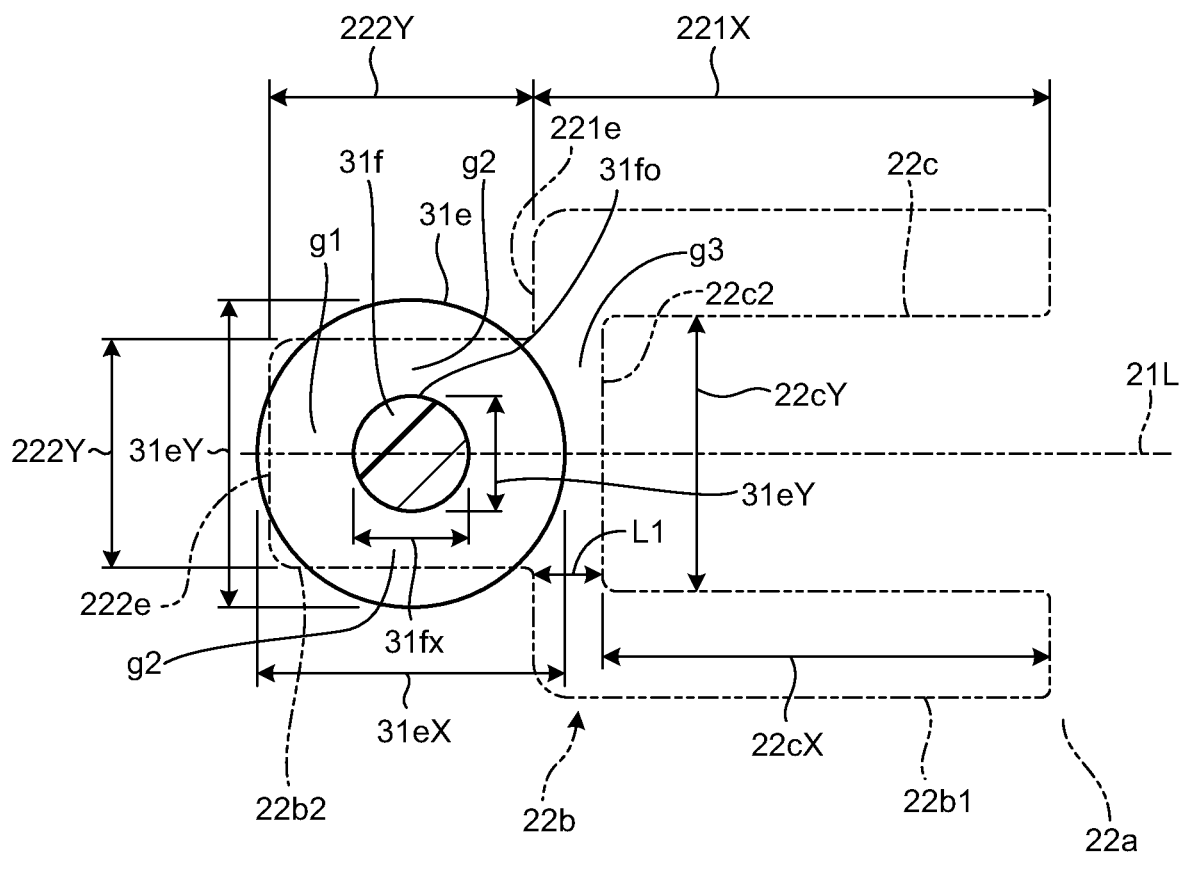
FIG. 12 is a sectional view of a connection part orthogonal to a top-and-bottom direction thereof.

FIG. 9 is a perspective view of the structure 1A according to the second embodiment. FIG. 10 is a plan view of the first base member 21 provided to the structure 1A according to the second embodiment. FIG. 11 is a perspective view of the first base member 21, the first connector 11, and the second connector 12 provided to the structure 1A of the second embodiment. FIG. 12 is a sectional view of a connection part 31f orthogonal to the top-and-bottom direction Z thereof. As for the first routing material W1 in FIG. 9, only a single piece thereof is illustrated by omitting the others for the sake of explanations.

The structure 1A according to the present embodiment is different in regards to a locking structure of a first base member 21A and a first cover member 29A. Furthermore, the shape of a locking protruding part 31e and the shape of a connection part 31f provided to a second protector 3A according to the second embodiment are different from the shape of the locking protruding part 31d and the shape of the connection part 31c provided to the second protector 3 according to the first embodiment.

A second base member 31A includes a second main body base part (holding member base part) 31a, the locking protruding part 31e, the connection part 31f, and the guide part 31d.

Figure 13:
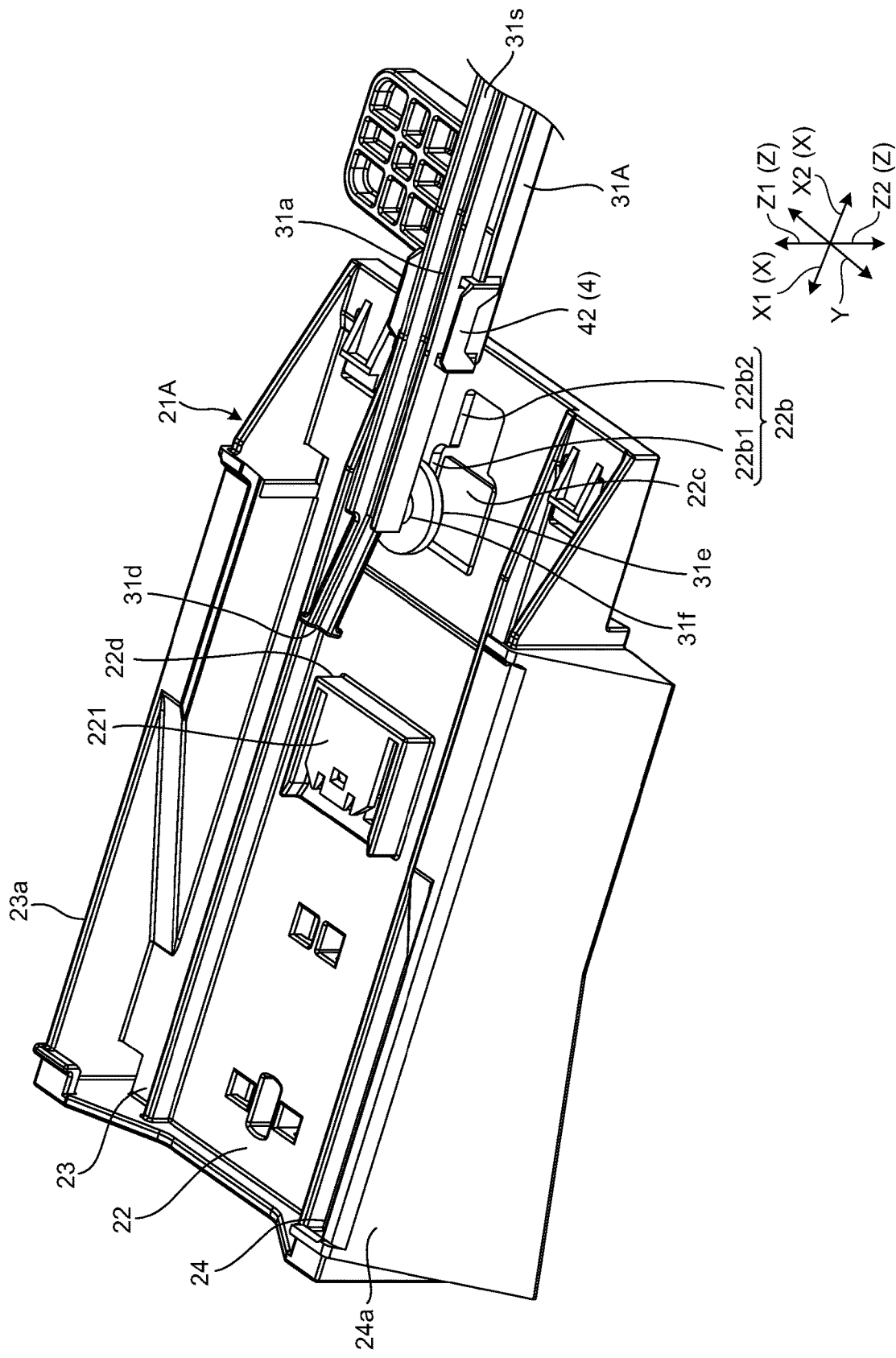
FIG. 13 is a perspective view for describing assembly of the structure in order in assembly work of the structure according to the second embodiment.

As illustrated in FIG. 12 and FIG. 13, the locking protruding part 31e is provided in the second main body base part 31a, and can be inserted into the insertion area 22b1. The locking protruding part 31e is attached to the bottom wall of the second main body base part 31a via the connection part 31f.

The locking protruding part 31e is formed in a columnar shape. In other words, when viewed from the top-and-bottom direction Z, the locking protruding part 31e is formed in a circular shape. The connection part 31f is formed in a columnar shape. Furthermore, the size of the locking protruding part 31e in the radial direction is larger than the size of the connection part 31f in the radial direction. Therefore, when viewed from the top-and-bottom direction Z, the locking protruding part 31e protrudes toward the outer side of the radial direction from the outer peripheral face of the connection part 31f. Furthermore, the length of the locking protruding part 31e in the lateral direction Y is longer than the length of the connection part 31f in the lateral direction Y. Moreover, the length of the locking protruding part 31e in the longitudinal direction X is longer than the length of the connection part 31f in the longitudinal direction X.

As for the locking protruding part 31e, the length in the longitudinal direction X is 31eX, and the length in the lateral direction Y is 31eY. Furthermore, the length 31eX in the longitudinal direction X of the locking protruding part 31e is shorter than the length 221X in the longitudinal direction X of the insertion area 22b1. Moreover, the length 31eY in the lateral direction Y of the locking protruding part 31e is shorter than the length 221Y in the lateral direction Y of the insertion area 22b1. Therefore, the locking protruding part 31e can be inserted into the insertion area 22b1, and can be pulled out from the insertion area 22b1.

The length 31eY in the lateral direction Y of the locking protruding part 31e is longer than the length 222Y in the lateral direction Y of the locking area 22b2. Therefore, the locking protruding part 31e is restricted from being inserted from the locking area 22b2 and restricted from being pulled out from the locking area 22b2.

The connection part 31f is formed in a columnar shape. In other words, when viewed from the top-and-bottom direction Z, the connection part 31f is formed in a circular shape. As for the connection part 31f, the length in the longitudinal direction X is 31fX, and the length in the lateral direction Y is 31fY. Furthermore, the length 31fX in the longitudinal direction X of the connection part 31f is shorter than the length 222X in the longitudinal direction X of the locking area 22b2. Moreover, the length 31fY in the lateral direction Y of the connection part 31f is shorter than the length 222Y in the lateral direction Y of the locking area 22b2. Therefore, the connection part 31f is movable inside the locking area 22b2.

The locking structure 4 is a structure that locks a second base member 31A and a second cover member 39A. The locking structure 4 according to the present embodiment is configured with: the locking claw part 41 provided to the second cover member 39A; and the locked part 42 which is provided to the second base member 31A and to which the locking claw part 41 can be inserted.

Next, a mounting method of the structure 1A according to the present embodiment will be described. The operator disposes a plurality of the first routing materials W1 in the second housing space 31s of the second base member 31A.

Then, the operator inserts the locking claw part 41 to the locked part 42 to attach the second cover member 39A to the second base member 31A. Then, in a state where the second cover member 39A is attached to the second base member 31A, a part of the first routing materials W1 on the connecting direction X1 side housed in the second housing space 31s is exposed from the opening on the connecting direction X1 side of the second base member 31A.

Then, the operator attaches the first base member 21A to a car body. Then, as illustrated in FIG. 13, the operator disposes the locking protruding part 31e of the second protector 3 on the top direction Z1 side of the insertion area 22b1 in the first base member 21A.

Figure 14:
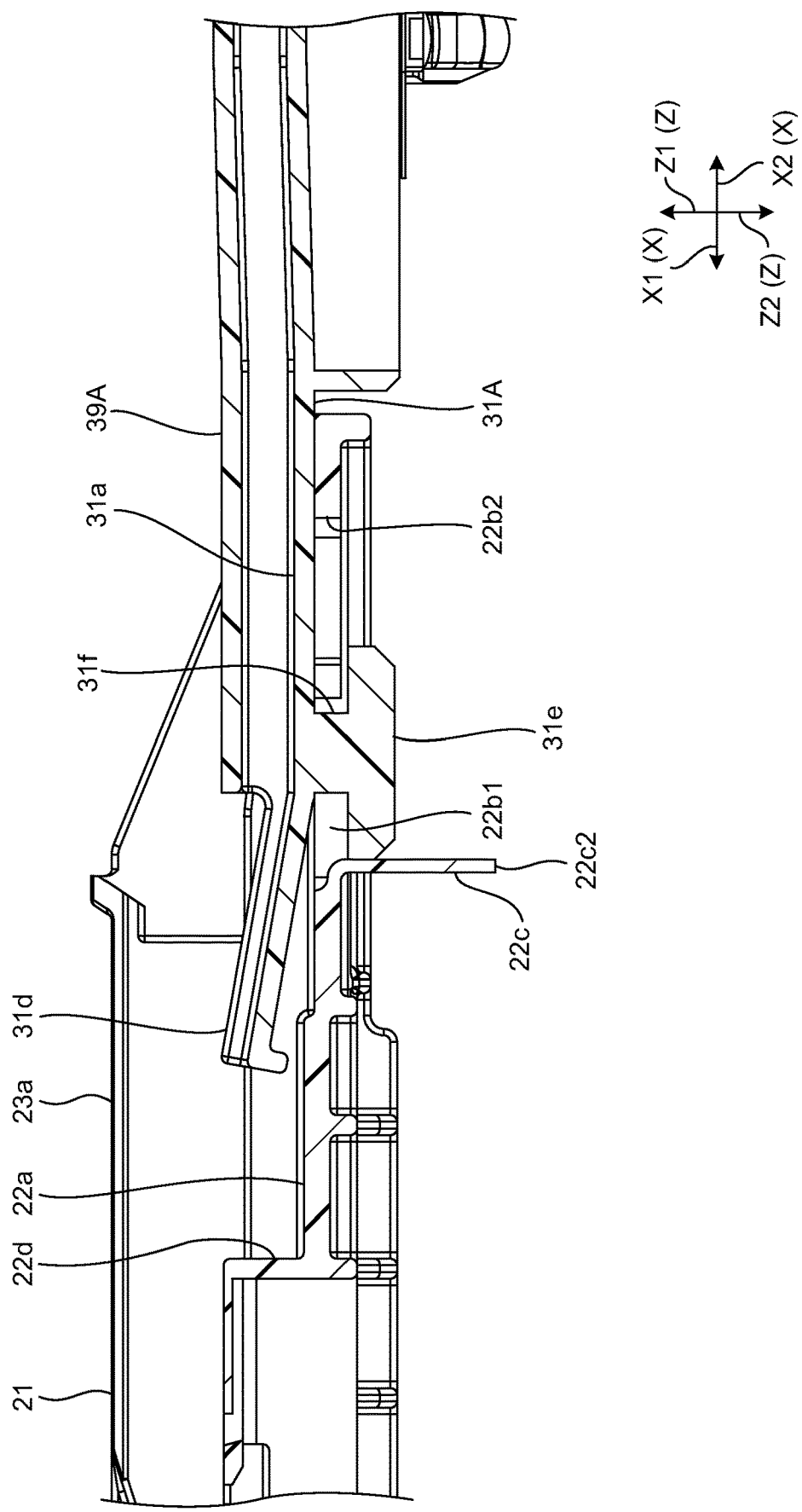
FIG. 14 is a sectional view for describing assembly of the structure in order, in assembly work of the structure according to the second embodiment.

Then, the operator moves the second protector 3 toward the bottom direction Z2 to bring the bottom face of the locking protruding part 31e to be in contact with the top face of the elastic deformation part 22c. Then, the operator continues to move the second protector 3 toward the bottom direction Z2 to elastically deform the elastic deformation part 22c as illustrated in FIG. 14, and the locking protruding part 31e is inserted into the insertion area 22b1. At this time, the fixed end 22c1 of the elastic deformation part 22c is elastically deformed, and the free end 22c2 thereof faces toward the bottom direction Z2. Furthermore, the locking protruding part 31e and the connection part 31f are disposed in the insertion area 22b1.

Then, the operator moves the second protector 3 toward the locking direction X2 side. Thus, the locking protruding part 31e and the connection part 31f are moved toward the locking direction X2 side.

Figure 15:
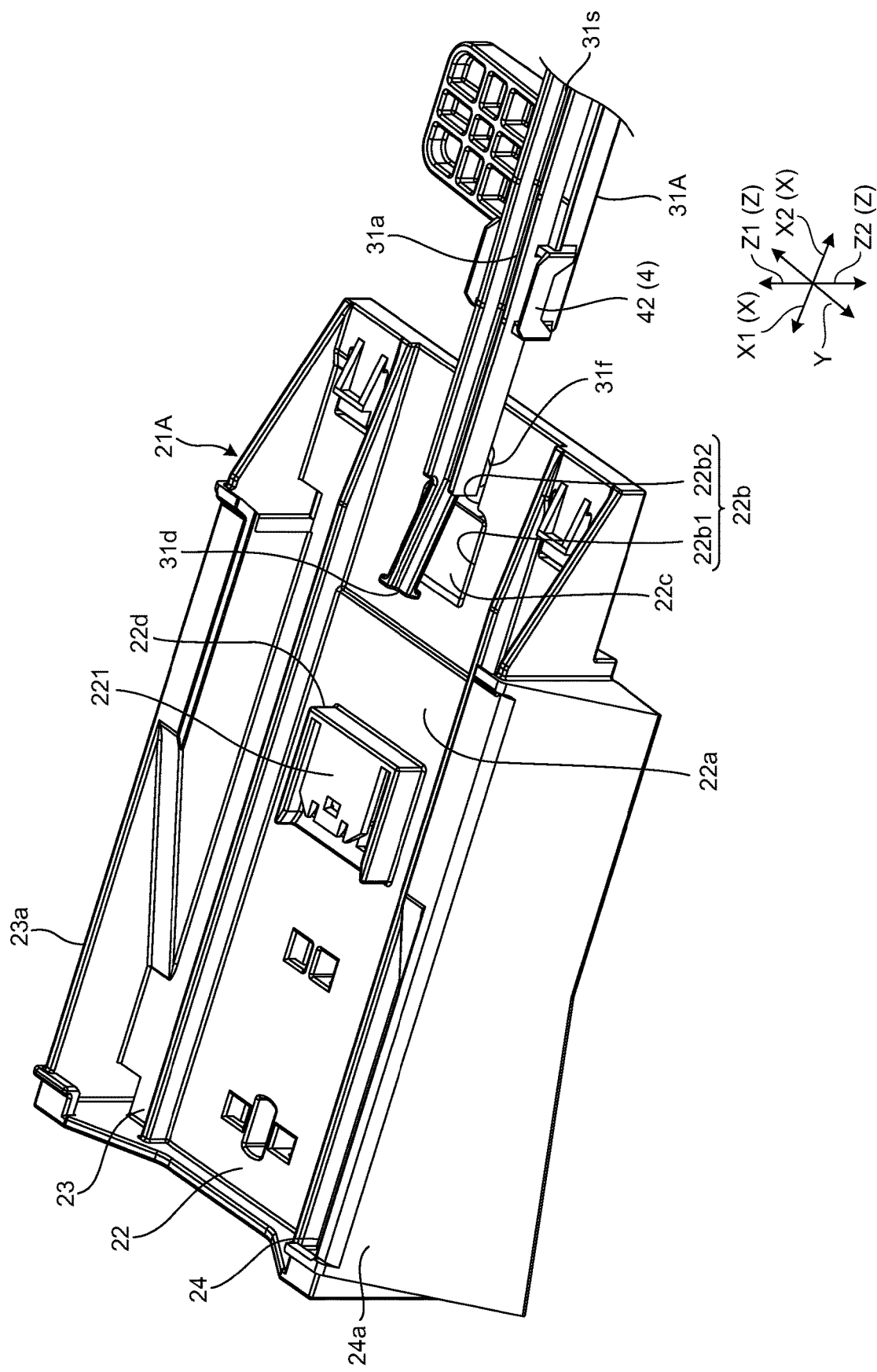
FIG. 15 is a perspective view for describing assembly of the structure in order, in assembly work of the structure according to the second embodiment.
Figure 16:
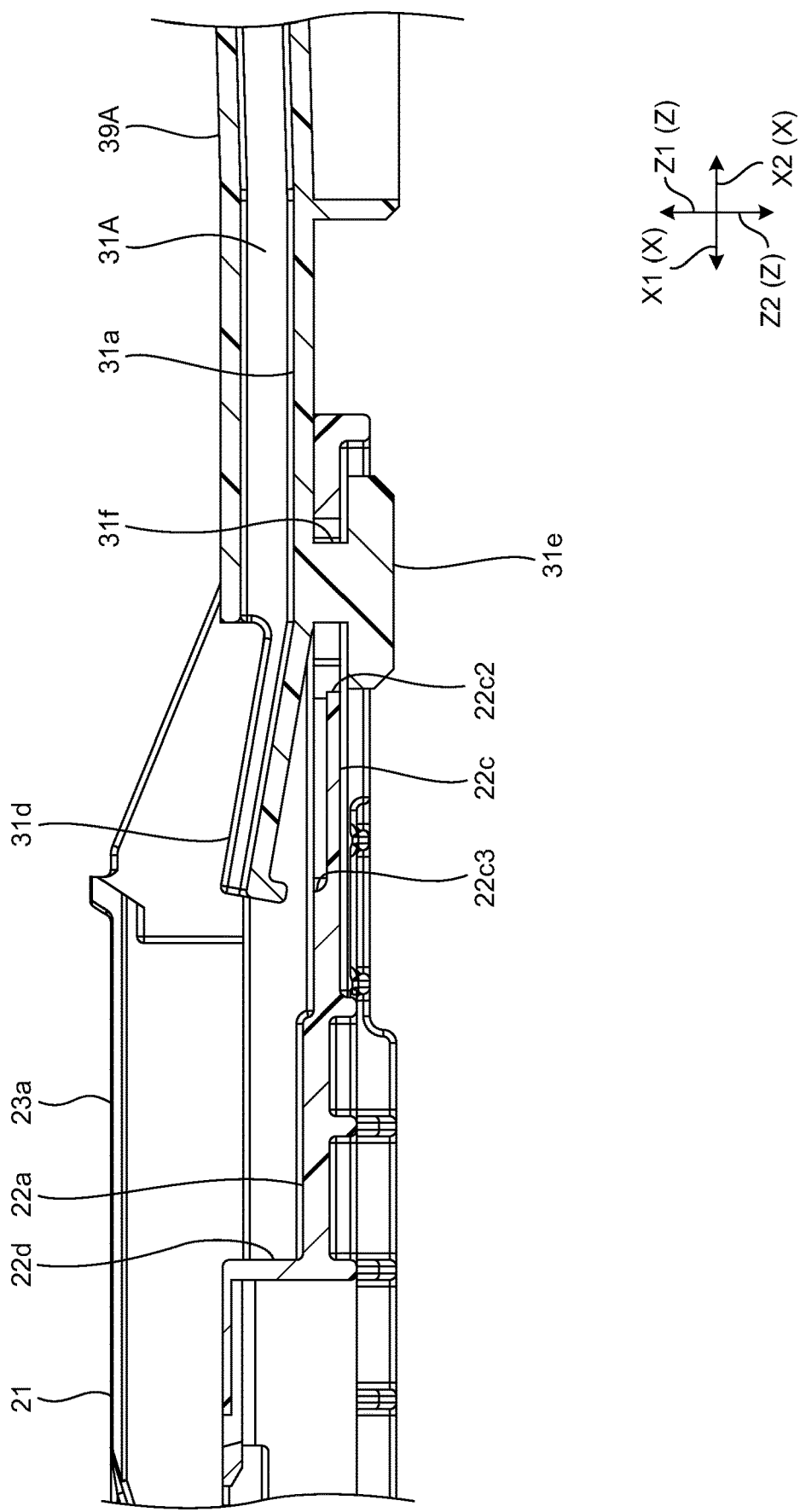
FIG. 16 is a sectional view for describing assembly of the structure in order, in assembly work of the structure according to the second embodiment.

When the second protector 3 is continuously moved toward the locking direction X2 side, the locking protruding part 31e and the elastic deformation part 22c gradually come to be in noncontact. Thus, as illustrated in FIG. 15 and FIG. 16, the elastic deformation part 22c is elastically restored and the connection part 31f moves to the locking area 22b2, so that the locking protruding part 31e is engaged with the locking hole part 22b to be in a locked state.

As described above, as for the locking protruding part 31e, the length 31eY in the lateral direction Y of the locking protruding part 31e is longer than the length 221Y in the lateral direction Y of the locking area 22b2. Therefore, in the locked state, as illustrated in FIG. 12, when viewed from the top-and-bottom direction Z, a part of the locking protruding part 31e overlaps with a part of the first main body base part (protection member base part) 22a in the lateral direction Y. Therefore, the locking protruding part 31e is restricted from being pulled out toward the top-and-bottom direction Z from the locking area 22b2.

Furthermore, in the locked state, in the longitudinal direction X, the length of the third gap g3 (the length L1 in the longitudinal direction X of the third gap g3 in FIG. 12) formed by the free end 22c2 and the insertion edge part 221e on the locking direction X2 side of the insertion area 22*b*1 is shorter than the length 31*e*X of the locking protruding part 31*e* in the longitudinal direction X. Therefore, the locking protruding part 31*e* is restricted from being pulled out toward the top-and-bottom direction Z from the locking hole part 22*b*.

Furthermore, as for the structure 1A in the locked state, the connection part 31*f* is restricted from moving toward the insertion area 22*b*1 by the free end 22*c*2 of the elastic deformation part 22*c*.

Furthermore, in the locked state, when viewed from the top-and-bottom direction Z, the first gap g1 exists between a connection outer peripheral face 31*fo* of the connection part 31*f* and the locking edge part 222*e* of the locking area 22*b*2 in the longitudinal direction X, and the second gap g2 exists between the connection outer peripheral face 31*fo* of the connection part 31*f* and the locking edge part 222*e* of the locking area 22*b*2 in the lateral direction Y. Therefore, even in the locked state, the connection part 31*f* is movable inside the locking area 22*b*2 for the longitudinal direction X and the lateral direction Y.

Then, the operator inserts the terminals provided at the end parts of each of the first routing materials W1 to the first cavity 11*a* of the first connector 11, and connects the first routing materials W1 to the first connector 11.

Then, the operator attaches the first connector 11 to the first base member 21A. Thereafter, the operator fits the second connector 12 to the first connector 11. In a state where the second connector 12 is fitted to the first connector 11, the second core materials Wa2 of second routing materials W2 connected to the second connector 12 and the first core materials Wa1 of the first routing materials W1 connected to the first connector 11 are electrically connected.

At last, the operator mounts the first cover member 29A to the first base member 21A, and assembling of the structure 1 is completed.

First Modification Example of Second Embodiment

Next, a structure 1B according to a first modification example of the second embodiment will be described. Hereinafter, explanations of the same structural elements as those of the structure 1A according to the second embodiment are omitted by applying the same reference signs thereto, and different structural elements are to be described.

Figure 17:
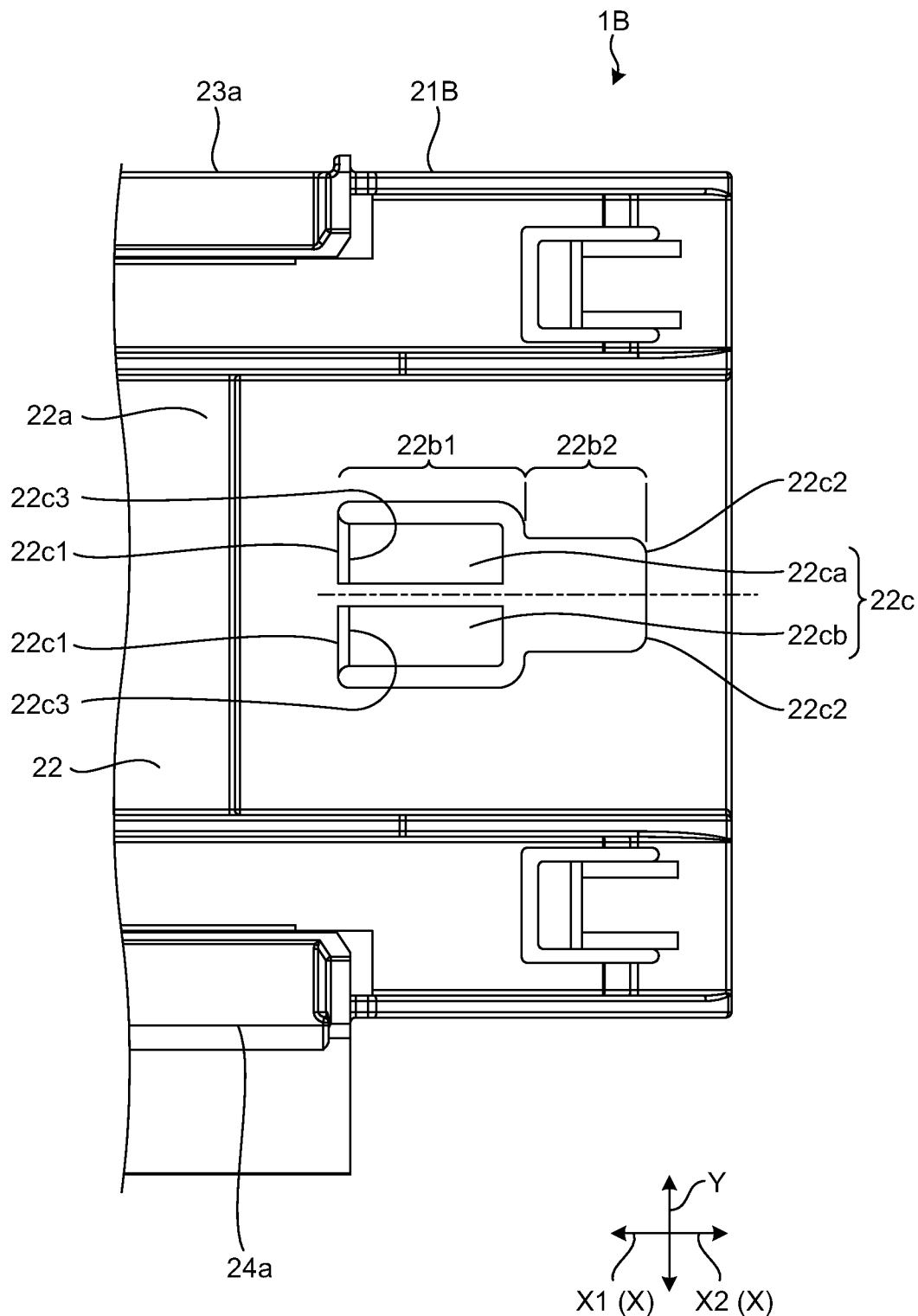
FIG. 17 is a plan view of a first base member provided to a structure according to a first modification example of the second embodiment.

FIG. 17 is a plan view of a first base member 21B of the structure 1B according to the first modification example of the second embodiment.

The elastic deformation part 22*c* according to the first modification example includes a first elastic deformation part 22*ca* and a second elastic deformation part 22*cb* positioned by being isolated from each other in the lateral direction Y. The first elastic deformation part 22*ca* has the fixed end 22*c*1 on the connecting direction X1 side that is connected to the first main body base part (protection member base part) 22*a* in the longitudinal direction X, and has the free end 22*c*2 on the locking direction X2 side. The second elastic deformation part 22*cb* has the fixed end 22*c*1 on the connecting direction X1 side that is connected to the first main body base part (protection member base part) 22*a* in the longitudinal direction X, and has the free end 22*c*2 on the locking direction X2 side.

The structure 1 according to the present embodiment has the following configuration. The elastic deformation part 22*c* includes the first elastic deformation part 22*ca* and a second elastic deformation part 22*cb* positioned by being isolated from each other in the lateral direction Y. The first elastic deformation part 22*ca* has the fixed end 22*c*1 on the connecting direction X1 side that is connected to the protection member base part 22*a* in the longitudinal direction X, and has the free end 22*c*2 on the locking direction X2 side. The second elastic deformation part 22*cb* has the fixed end 22*c*1 on the connecting direction X1 side that is connected to the protection member base part 22*a* in the longitudinal direction X, and has the free end 22*c*2 on the locking direction X2 side. Therefore, even if one of the first elastic deformation part 22*ca* and the second elastic deformation part 22*cb* is in a damaged state, it is possible with the structure 1 according to the present embodiment to maintain the mounted state of the holding member 3 with the protection member 2 by the other remaining part.

Note that the first protector 2 regarding the structure 1 of the first embodiment is described above to form the first base member 21 and the first cover member 29 separately. However, the structure 1 according to the present embodiment is not limited thereto. The first base member 21 and the first cover member 29 may be formed integrally via a hinge.

Furthermore, the second protector 3 regarding the structure 1 of the first embodiment is described above to form the second base member 31 and the second cover member 39 separately. However, the structure 1 according to the present embodiment is not limited thereto. The second base member 31 and the second cover member 39 may be formed integrally via a hinge.

Furthermore, as for the structures 1 and 1A according to the embodiments described above, a part of the configuration of each of the embodiments may be separated and combined with a part of the configuration of the other embodiment.

The structure according to the embodiments has the above-described configuration. Therefore, it is possible to provide the structure capable of mounting the protection member to the holding member and to mount the elongated member holding the routing materials to the other member even when the protection member and the holding member have dimensional variations in the longitudinal direction and the lateral direction.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A structure comprising:
   a protection member that protects a connection member connected to a routing material; and
   an elongated holding member extending in a longitudinal direction as an extending direction of the routing material and holding the routing material, wherein
   the protection member includes:
   a protection member base part;
   a locking hole part opened through the protection member base part along a top-and-bottom direction; and
   an elastic deformation part formed to be elastically deformable with respect to the protection member base part, the elastic deformation part opposing to the locking hole part in the longitudinal direction, when viewed from the top-and-bottom direction,
   the elastic deformation part has a fixed end on a connecting direction side that is connected to the protection member base part in the longitudinal direction, and has a free end on a locking direction side that is an opposite direction of the connecting direction, the locking hole part includes an insertion area, and a locking area positioned on the locking direction side with respect to the insertion area, the holding member includes:

a holding member base part;

a locking protruding part that is provided to the holding member base part and capable of being inserted into the insertion area; and a connection part that connects the holding member base part and the locking protruding part, in a locked state where the locking protruding part is engaged with the locking hole part, the connection part is positioned in the locking area and a part of the locking protruding part overlaps with a part of the protection member base part in a lateral direction orthogonal to the longitudinal direction, when viewed from the top-and-bottom direction, in the locked state, a third gap formed by the free end and an insertion edge part of the insertion area on the locking direction side in the longitudinal direction is shorter than a length of the locking protruding part in the longitudinal direction, in the locked state, when viewed from the top-and-bottom direction, a first gap exists between a connection outer peripheral face of the connection part and a locking edge part of the locking area in the longitudinal direction, and a second gap exists between the connection outer peripheral face of the connection part and the locking edge part of the locking area in the lateral direction, and in a state where the locking protruding part is brought in contact with the elastic deformation part to elastically deform the elastic deformation part, the locking protruding part is inserted into the insertion area, the holding member is moved toward the locking direction side, the elastic deformation part is elastically restored, and the locking protruding part is engaged with the locking hole part to be in an engaged state, the connection part is restricted from moving toward the insertion area by the free end.

2. The structure according to claim 1, wherein the elastic deformation part includes a first elastic deformation part and a second elastic deformation part positioned by being isolated from each other in the lateral direction, the first elastic deformation part has a fixed end on the connecting direction side that is connected to the protection member base part in the longitudinal direction, and has a free end on the locking direction side, and the second elastic deformation part has a fixed end on the connecting direction side that is connected to the protection member base part in the longitudinal direction, and has a free end on the locking direction side.

* * * * *